(12) United States Patent
Beals

(10) Patent No.: US 11,949,939 B2
(45) Date of Patent: Apr. 2, 2024

(54) NON-VOLATILE MEMORY SYSTEM AND METHOD FOR STORING AND TRANSFERRING SET TOP BOX SYSTEM DATA

(71) Applicant: DISH Network L.L.C., Englewood, CO (US)

(72) Inventor: William Michael Beals, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/710,138

(22) Filed: Mar. 31, 2022

(65) Prior Publication Data

US 2023/0319340 A1 Oct. 5, 2023

(51) Int. Cl.
*H04N 21/426* (2011.01)
*H04N 21/4363* (2011.01)
*H04N 21/443* (2011.01)

(52) U.S. Cl.
CPC . *H04N 21/42646* (2013.01); *H04N 21/43637* (2013.01); *H04N 21/4436* (2013.01)

(58) Field of Classification Search
None
See application file for complete search history.

(56) References Cited

U.S. PATENT DOCUMENTS

| | | | |
|---|---|---|---|
| 8,583,865 B1* | 11/2013 | Sade | G06F 12/0868 |
| | | | 711/E12.016 |
| 9,293,032 B2* | 3/2016 | Linebarger, Jr. | G08C 23/04 |
| 9,396,424 B1* | 7/2016 | Loman | G06K 19/0727 |
| 9,881,250 B2* | 1/2018 | Lovell | G05B 15/02 |
| 2004/0220926 A1* | 11/2004 | Lamkin | G11B 27/105 |
| 2005/0097607 A1* | 5/2005 | Kummer | H04N 21/4334 |
| | | | 725/89 |
| 2008/0134237 A1* | 6/2008 | Tu | H04N 7/1675 |
| | | | 725/38 |
| 2008/0158003 A1* | 7/2008 | Linebarger | G08C 17/02 |
| | | | 340/12.22 |
| 2009/0019492 A1* | 1/2009 | Grasset | H04N 21/4325 |
| | | | 348/E7.071 |
| 2009/0231109 A1* | 9/2009 | Reichert | G06K 7/0008 |
| | | | 340/572.1 |

(Continued)

FOREIGN PATENT DOCUMENTS

| | | | | |
|---|---|---|---|---|
| CN | 101383017 A1 * | 3/2009 | | G08C 17/02 |
| EP | 2202705 A1 * | 6/2010 | | G08C 17/02 |

(Continued)

*Primary Examiner* — William J Kim
(74) *Attorney, Agent, or Firm* — Seed IP Law Group LLP

(57) ABSTRACT

A nonvolatile memory is coupled to a processor in a set top box. On the timing sequence set within the system, set top box data is transferred from the processor to the nonvolatile memory. Set top box system data includes user data and set top box specific data. The current data is maintained in the nonvolatile memory. The system data can be transferred to second memory by a wireless connection even when the set top box is not coupled to a power supply. The system data can then be provided from the second memory to any selected device, computer or location, such as another set top box, a diagnostic tool, a repair facility or other selected location.

14 Claims, 8 Drawing Sheets

(56) References Cited

U.S. PATENT DOCUMENTS

| | | | |
|---|---|---|---|
| 2009/0302998 A1* | 12/2009 | Trappeniers | H04L 63/0853 |
| | | | 709/201 |
| 2011/0239253 A1* | 9/2011 | West | H04N 21/25891 |
| | | | 725/46 |
| 2012/0079100 A1* | 3/2012 | McIntyre | H04W 4/90 |
| | | | 709/224 |
| 2012/0185893 A1* | 7/2012 | Wendling | H04N 21/4755 |
| | | | 725/28 |
| 2013/0231945 A1* | 9/2013 | Barry | G06Q 10/10 |
| | | | 705/2 |
| 2013/0263171 A1* | 10/2013 | Calhoun | H04N 21/4622 |
| | | | 725/110 |
| 2013/0297458 A1* | 11/2013 | Van de Capelle | |
| | | | G06Q 30/0635 |
| | | | 705/26.81 |
| 2014/0256255 A1* | 9/2014 | Thomas | H04N 21/4222 |
| | | | 455/41.1 |
| 2015/0033260 A1* | 1/2015 | Ryu | H04N 21/4826 |
| | | | 725/40 |
| 2015/0095936 A1* | 4/2015 | Yu | H04N 21/4334 |
| | | | 725/98 |
| 2015/0116296 A1* | 4/2015 | Greene | H02J 50/12 |
| | | | 345/211 |
| 2016/0114956 A1* | 4/2016 | Felix | B65D 81/07 |
| | | | 206/583 |
| 2016/0239696 A1* | 8/2016 | Mats | G06K 7/10366 |
| 2017/0091710 A1* | 3/2017 | Van Dyke | G06Q 10/0835 |

FOREIGN PATENT DOCUMENTS

| | | | | |
|---|---|---|---|---|
| KR | 20090119269 A | * | 11/2009 | G06K 19/0723 |
| KR | 2011137124 A | * | 12/2011 | G06K 19/0723 |

* cited by examiner

NON-VOLATILE MEMORY SYSTEM AND METHOD FOR STORING AND TRANSFERRING SET TOP BOX SYSTEM DATA

BACKGROUND

Technical Field

This disclosure is in the field of storing a backup of system specific data, and more particularly, is directed towards storing such data in a nonvolatile memory in a set top box.

Description of the Related Art

Set-top boxes are currently used to receive audio/video data signals, process the received data, provided to a display for viewing by a user and track a number of system specific settings associated with the particular user and their viewing preferences. The set top box can receive the data from a cable system, a satellite receiver system, the Internet, or various other sources. The set top box is paired with a one or more remote controls that transmit instructions to it in the form of wireless signals in order to control the operation of the set top box for the display of the data input to it. The system specific data may include a number of features that are relevant to the particular set top box, its operational characteristics, the user's local network configuration, the user's viewing preferences, the user's viewing history and a number of other system specific data points. It is currently known to store such system specific settings within the set top box. It is also known to wirelessly transmit the system specific settings to the remote control that is paired with that particular set top box. The remote control will store the system specific settings in a memory in the remote control. In the event the set top box becomes damaged, needs to be replaced, or the system specific data is lost, the data which has been stored in the remote control can be transferred back to the same set top box or, alternatively, if it is being replaced, it can transfer the system specific data to a replacement set top box so it has stored therein the information regarding this particular system as part of the setup of the replacement set top box.

BRIEF SUMMARY

According to principles of the present disclosure, a set top box nonvolatile memory is coupled to a processor in a set top box. The nonvolatile memory can be on the same printed circuit board as the processor or on a separate substrate that is coupled to the processor to receive data from it in any acceptable method. On the timing sequence set within the system, set top box data is transferred from the processor to the nonvolatile memory. Set top box system data includes user data and set top box specific data. The data is updated in the nonvolatile memory on a timing sequence that is set up in the processor. The current data is maintained in the nonvolatile memory. A type of nonvolatile memory is selected for which no power is needed to be provided to the nonvolatile memory in order to maintain the data for long periods of time. Thus, if no power is provided to the system, the content of the data will remain the same.

The system also includes an antenna system coupled to the nonvolatile memory. The antenna system is of the type that can receive a signal wirelessly from an external source and generate electrical power based on the received signal. The intended system is also of the type that can transmit data to and from the nonvolatile memory. The antenna system may be of any acceptable type of many known in the art, such as an NFC system or an RFID system. In some embodiments, it may include a high-power Wi-Fi system, a Bluetooth system or the like. When there is a need to transfer the data from the nonvolatile memory to a new location, a signal that contains power is sent to the antenna system which is coupled to the nonvolatile memory. The antenna system converts the wireless signal to an electrical power signal that is provided to the nonvolatile memory. This generates sufficient power for the nonvolatile memory to retrieve data. A data request signal is then sent to the nonvolatile memory, requesting that it output the data stored therein. Upon receiving the request, the nonvolatile memory, using the power provided on the antenna system, outputs the data stored therein using the antenna system so that it can be received at an external location.

The data can be received by a transfer processor, a diagnostic processor, another set top box, or any acceptable electronic storage. The data is stored at the received system. The stored data can then have a number of potential uses, including reprogramming a new set top box for the same user, performing a diagnostic analysis on the set top box, performing a user data query of the set top box data or any other number of acceptable uses for data that is unique to that particular set top box.

One benefit of this system is that data that is unique to that particular set top box can be transferred to a new set top box for the same user when the old set top box is being replaced. This provides significant benefits for a quick and easy upload of the unique data needed for that particular user at that particular location. Another benefit is that the set top box data can be stored on any acceptable system, such as a smart phone, a portable computer, a smart watch or other location and then downloaded at any other desired location to which the storage device has been transported, such as to a retail outlet, a mobile repair van, or other location. An additional benefit is that a query can be sent to the set top box in order to obtain health data regarding the set top box when the set top box is not electrically connected to the power, and in some embodiments when it is enclosed within a packing case in which it has been shipped to a new location. Accordingly, if the set top box has been shipped back to the factory for analysis and repair, the set top box data can be retrieved from the set top box while stored on a shelf and based on the results of the query, and analysis can be performed to determine whether or not the set top box should be repaired or discarded, and if to be repaired the type of repair which is preferred. The ability to obtain the set top box data when no power is provided provides significant convenience.

DETAILED DESCRIPTION

Figure 1A:
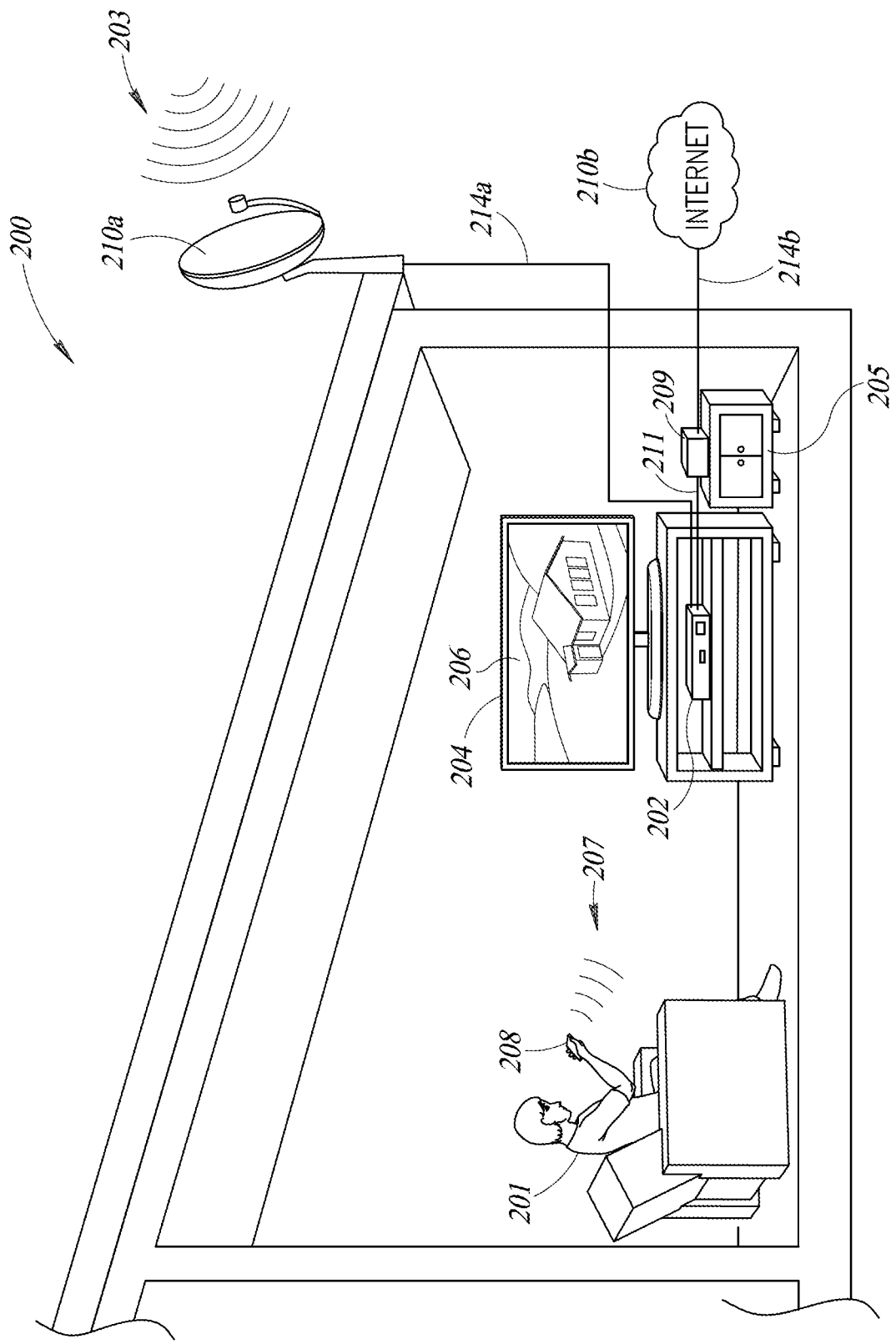
FIG. 1A is a schematic of one environment for use of the inventive nonvolatile set top box data storage system.

FIG. 1A is a schematic of one embodiment of an environment 200 in which the inventive nonvolatile memory set top box data storage system can be used. The environment 200 includes the inventive set top box 202 which receives data on a connection 211 from a router 209. The set top box can be any acceptable type, such as one that receives data from an Internet connection 210b, a satellite dish 210a that receives satellite broadcast signals 203 or any acceptable type. In the environment 200 of FIG. 1A, the set top box is downstream of the router 209 which is positioned on a stand 205. In this embodiment, the set top box receives a signal directly from the satellite dish 210a and the router 209 receives input via line 214b from an Internet source 210b. The internet connection is provided between the router 209 and the set top box 202 via a communication link 211. The link 211 can be any acceptable link, such as any wireless such as Wi-Fi, Bluetooth or the like or a hardwire cable connection or the like.

The set top box 202 outputs audiovisual data to a display tool in order to provide a video signal 206 for viewing by a user 201. The user 201 may control the output of the set top box 202 using any acceptable personal controller 208 by control signals 207. According to one embodiment, the set top box 202 does not have its own remote control. Instead, the user 201 will download an app on their unique user device 208 and then use that unique user device to control the operation set top box. This unique user device 208 can be a smart watch, a smart phone, a tablet, a portable computer or any acceptable device that can output a wireless signal 207 that carries instruction data to control the set top box 202. The unique user device 208 can obtain the application to interact with the set top box by downloading it from the Internet, the cloud, or any acceptable connection via wireless, hardwire connection or the like.

The set top box 202 includes a processor that stores data indicating the unique user devices 208 which may control it. It might be controlled by any of the unique user devices 208 by in a user in the home, whether one of the parents, a teenager, a guest, or other user. The set top box has a memory in which it stores unique system data for the set top box. This unique system data includes user specific data as well as unique data regarding the operation and identity of the particular set top box. This would include the model and serial number of the set top box, the operational settings of the set top box, and other setting specific to that particular set top box. In addition to storing user settings, the set top box specific data includes box health, signal strength hardware health and other information. It may also store information regarding its environment 200 and other information about the home. It may also be considered a black box for the Internet usage of the entire system, for itself or other components within the network in which it is coupled.

Figure 1B:
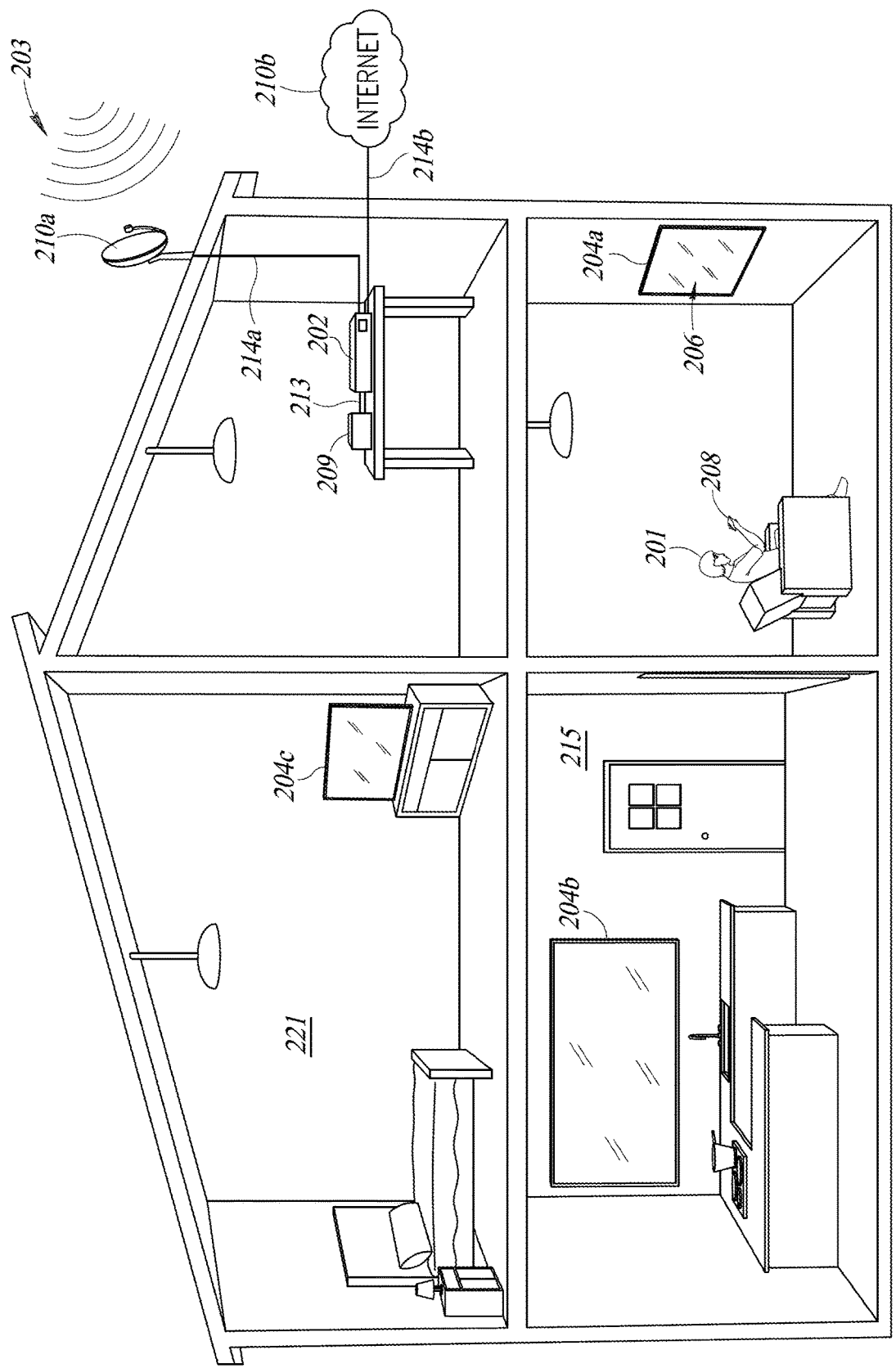
FIG. 1B is an alternative embodiment of the environment for use of the inventive nonvolatile set top box data storage system.

FIG. 1A is another environment in which the inventive set top box system may be used. In the embodiment of FIG. 1A, the set top box 202 directly receives input from various sources, such as the Internet 210b on line 214b, from a satellite dish 210a on line 214a which receives signal 203 as well as a number of other input devices. It can also be connected to a number of other devices in the home such as various displays, lighting systems, security systems or other devices on the same local network in the same home environment 200 in which the set top box 202 and to is used. In one embodiment of the environment of FIG. 1B, the set top box 202 outputs its data to a router 209 via link 213 in order to provide the data to various locations in the home. In other embodiments, the router 209 is within the set top box 202 so that the same housing includes the router 209 which outputs the data to the rest of the home and other items in the network. In a preferred embodiment, the router 209 is a wireless router that outputs the data via an acceptable wireless technique such as Wi-Fi, Bluetooth or the like.

The data output from the set top box 202 whether from its own internal router or an external router, is provided for use throughout the network of the home. The user 201 making use of their user unique device 208 can cause the router 209 to send the signal to the display 204a in order to view an audiovisual program 206 in a particular room of the house in which they are seated. The user 201 can be in any room of the home and control the set top box 202 to send signals to any display they select or that is selected for them by the system knowing the room from which the user is sending the signal. Alternatively, the user can be located in the kitchen 215 may send the video signal to a display 204 be positioned in the kitchen while they are cooking dinner on the stovetop or doing other activities. Further, a user positioned in a bedroom 221 may send the video signal to a display 204c for viewing on that display 204c while they are in the bedroom using their personal device 208 by sending control signal 207.

Figure 2A:
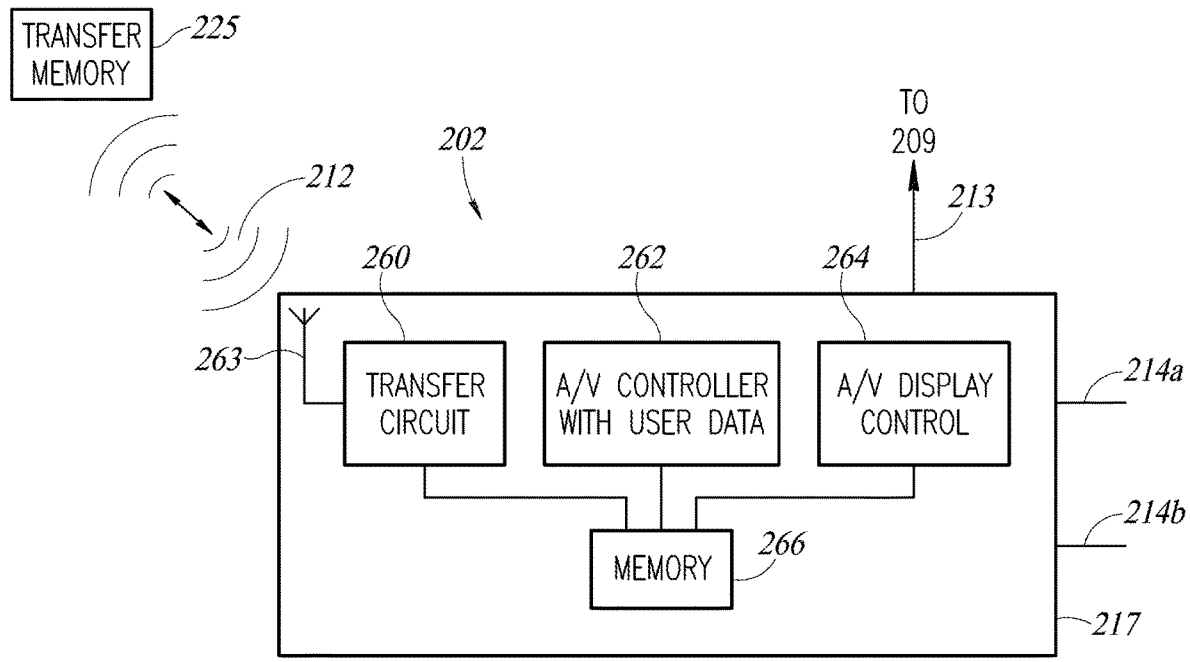
FIG. 2A is a schematic of one embodiment of the inventive nonvolatile set top box data storage system.

FIG. 2A illustrates the details of a set top box 202 according to one embodiment. According to this embodiment, the set top box 202 includes a housing 217 which has within it a number of circuits that provide operation of the set top box 202. These computer circuits include a data transfer circuit 260, an audiovisual controller circuit 262, an audio visual display controller 264, and a memory 266. The audiovisual controller 262 and the audiovisual display controller 264 can be any acceptable processors of the many known in the art. These are of a type commonly used in set top boxes 202 of which many are well known. The data transfer circuit 260 can be an NFC chip, and RFID chip, or any other acceptable transfer chip to move the data to a new location upon request. An antenna 263 is coupled to the data transfer circuit 260.

The memory 266 is a nonvolatile memory that can be written to by the host CPU, such as the audiovisual controller 262. The nonvolatile memory 266 is fully readable via a remote circuit, such as an NFC circuit acting as the transfer circuit 260 or other acceptable remote transfer circuit. In some embodiments, the transfer circuit 260 and the memory 266 will be within the same semiconductor circuit or in the same chip. In other embodiments, they will be on different semiconductor chips. The circuits 266 and 260 can be on the same printed circuit board as the processor controller 262 or they can be on a separate circuit board and be within the housing 217 of the set top box 202.

The CPU in the microprocessor controller 262 will write user settings to the memory 266 to keep the content current, as explained in more detail herein. If at any time, the set top box 202 experiences a catastrophic failure, the memory 266 will have stored therein the most current settings which can be read using the techniques as described herein.

The memory 266 can have a number of portions. It can have a first portion that is a nonvolatile memory that stores a long-term data set. This data set may be stored in a memory which can hold the data for several years, in excess of a decade with no power being provided to the memory 266. It may also include within it a shorter-term memory which may be a nonvolatile memory or a temporary memory. When the set top box is active, it may write data from the controller 262 to the memory 266 several times a minute. In one embodiment, this data is stored in a volatile memory that has power provided to it, such as a DRAM, and SDRAM, and SRAM, or the like. The data can be transferred rapidly several times a minute to this first memory within the memory circuit 266. Then, at a different time the temporary memory can upload its data to a long-term nonvolatile memory within the memory 266.

According to one embodiment, the inventive system includes a sensor, whether software or other sensor that can receive an indication that the system is about to be shut down, such as might occur when the power is suddenly turned off. When the system is turned off, as part of the turnoff routine prior to full shut down the temporary memory can transfer the data store therein to the long-term nonvolatile memory within the memory circuit 266. For example, if the user decides to turn off the set top box as part of the turnoff routine before it switches its own internal power supply off it can perform a download of the data from the first memory portion to the nonvolatile memory portion within the memory 266. In addition, in the event the set top box 202 is suddenly deprived of power, such as being unplugged or failure in the power supply, a local backup power, such as stored in an internal capacitor, a small internal battery, or the like may provide sufficient power to perform the transfer from the temporary memory to the long-term nonvolatile memory within the memory circuit 266.

At least once each day, and frequently several times a day, all of the settings in the set top box 202 are sent to the memory 266 and stored therein in the nonvolatile memory, and in some instances a few times an hour. In another embodiment, the settings can be updated each time the user makes a substantive change to the set top box settings. In yet another embodiment, the settings can be updated each night when the set top box normally has low usage and available bandwidth, such as at 3:00 a.m. The system data in this event includes both set top box data and user specific data. The user specific data may include favorites, automatic shows to be recorded and watched, settings unique to each particular user, the identity of the user specific devices to wait for each user in the home and a large amount of user specific data for that particular environment 200. In addition, the system data stored in the memory 266 includes set top box specific data. This would include the model number, the serial number, the health of the set top box, the particular connection set up of the set top box and many other items that are unique to that particular set top box and the system. The set top box data will be unique to that particular set top box and the user data will be unique to the particular user or multiple users within the environment 200. Thus, the memory 266 stores, on a nonvolatile basis, user specific data and set top box specific data, as well as other data regarding the network of the environment in which it is being used. It also stores the diagnostic data of the set top box 202.

Figure 2B:
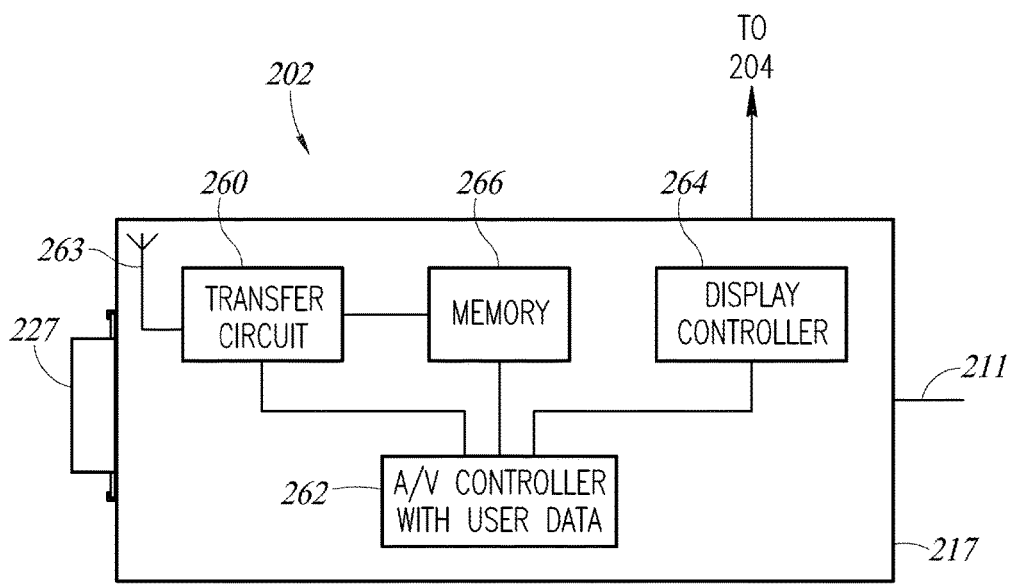
FIG. 2B is a schematic of an alternative embodiment of the inventive nonvolatile memory set top box data storage system.

FIG. 2B illustrates an alternative embodiment of the set top box 202. In this alternative embodiment, the data transfer circuit 260 is coupled directly to the AV controller processor 262. It may also, alternatively, be coupled to the memory 266. The data transfer circuit 260 is within the housing 217 and includes an antenna 263. Coupled to an outside of the housing without an electrical connection to the data transfer circuit 260 is a nonvolatile memory 227. This nonvolatile memory 227 includes within it an antenna that can receive data from the transfer circuit 260 and store in a nonvolatile basis all of the data that is transferred therein. In the embodiment of FIG. 2B, the nonvolatile memory 227 is mechanically coupled to the housing 217 but is not electrically coupled to any of the circuits with a hardwired connection that are within the housing 217. Instead, the only connection is a wireless connection to transfer data to the memory 227 via the antenna 263. In the embodiment of FIG. 2B the transfer circuit 260 transmits the system data at least once a day, and preferably two or three times per day to the nonvolatile memory 227 which is coupled to the outside of the housing 217 of the set top box 202. One benefit of not having a direct electrical cable connection from the circuits inside the set top box 202 to the memory 227 is the protection from a power surge, an internal overheating, or other destruction of all of the circuits inside the housing 217 of the set top box 202. The only connection to the nonvolatile memory 227 is a wireless connection which requires a transmission of both a power drive signal and a data signal from the transfer circuit 260 to the nonvolatile memory in order to write new data to the nonvolatile memory 227. In the event there is a catastrophic failure of the set top box 202, antenna 260c will not be driven with power, but instead will be disabled, thus providing an isolation safety feature for the data which is stored in the nonvolatile memory 227. Another benefit is that the memory 227 can be removed and become the transfer memory 225 that is shown in FIG. 2A with no further steps needing to be taken since it has already received, wireless the system data.

Figure 2C:
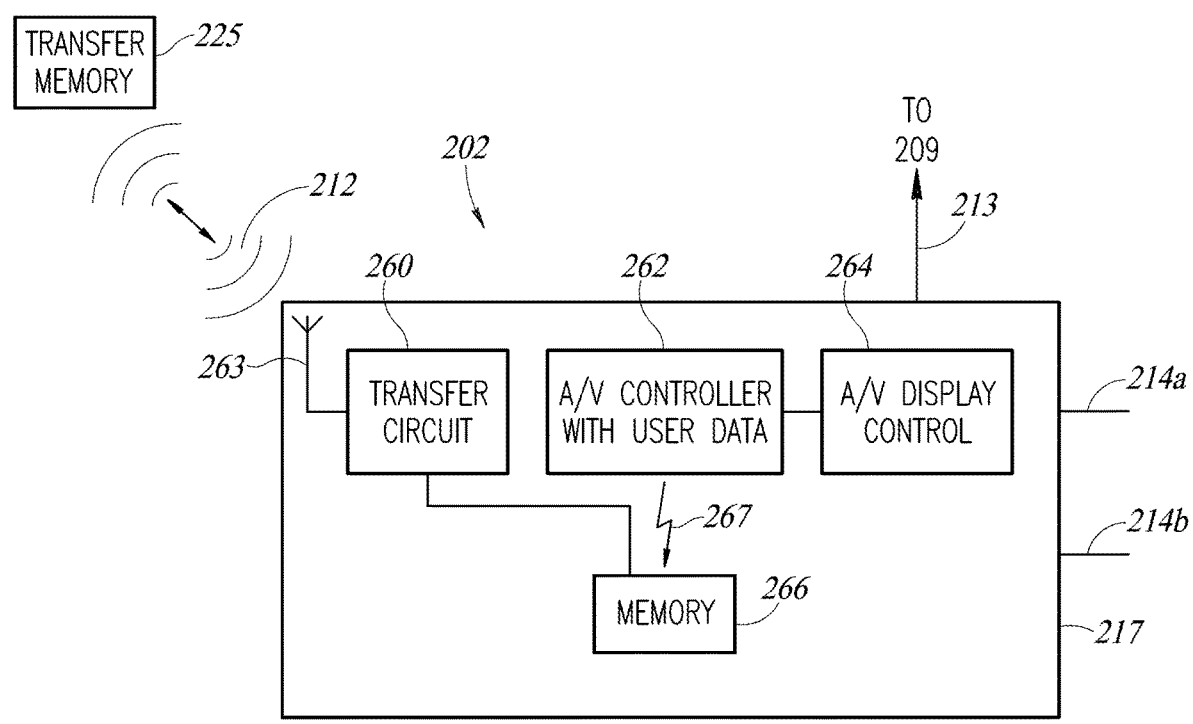
FIG. 2C is an alternative embodiment of the inventive nonvolatile memory set top box data storage system.

FIG. 2C illustrates yet another embodiment of the set top box 202 which has an alternative data transfer in isolation system. According to the embodiment of FIG. 2C, the transfer of data from the AV controller processor 262 is via an optical transfer 267. This optical transfer is a light base signal which transfers data by the output of light from the processor 262 to the memory 266. As previously noted, the memory 266 may include within it the transfer circuit 260 so they are both in the same circuit, or they can be in separate circuits. In the embodiment in which an optical coupling is used to transfer the data from the processor 262 to the nonvolatile memory 266 further isolation is provided in the event of a catastrophic failure of the controller 262, such as a power surge, overheating or the like.

Figure 3:
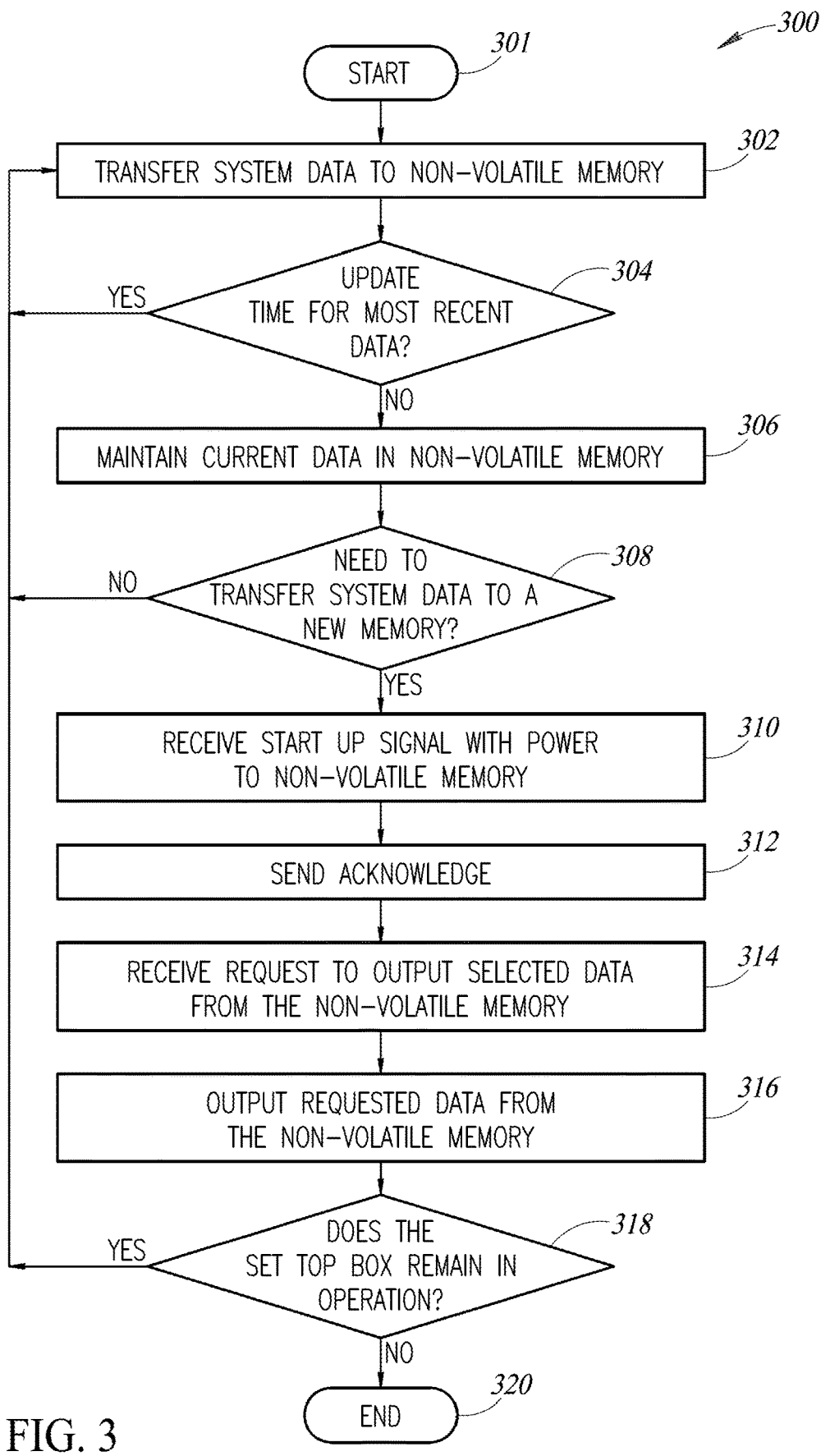
FIG. 3 is a flow chart showing operation of the inventive nonvolatile memory set top box data storage system.

The operation of the inventive nonvolatile memory storage system will now be described with respect to the flowchart of FIG. 3 in combination with FIGS. 2A, 2B and 2C. Under control of a program stored in the audiovisual controller processor 262, system data is transferred to the memory 266 which will include a nonvolatile memory section. As previously described with respect to the other alternative embodiments, it may also be transferred to an external nonvolatile memory 227. The process starts at step 301 and then proceeds to carry out the steps shown in the flow chart 300. The system data which will include both user data and set top box data is transferred on a timing sequence or an event occurring, such as an update being made to the user data, according to the program stored in the processor 262, as shown in step 302. The program operating inside of the processor 262 determines when it is time to update the memory 266 with the most recent data in step 304. If it is time to update the memory 266 with the most recent data as determined in step 304, then the operation of step 302 is carried out again to transfer the system data to the nonvolatile memory 266. If it is not time to update the most recent data, then the most current data is maintained in the nonvolatile memory in step 306. At some time, there may be a need or desire to transfer the data in the nonvolatile memory 266 to a new memory 225 as set forth in step 308. If there is not a request to transfer the data to a new memory 225, then the current data is maintained as shown in step 306 and the system returns to step 302 to perform another update. On the other hand, if there is a request to transfer the system data to a new memory 225 then the process advances to step 308. In step 310, the transfer circuit 260 receives a startup power signal 212 from a transfer memory 225. This signal 212 contains sufficient power within the wireless signal such that it can permit the transfer circuit 260 to generate the power needed to operate the nonvolatile memory 266. Thus, even though the memory 266 might not be currently connected to power because the set top box is unplugged, disconnected, or destroyed, there is sufficient power in the received signal 212 in order to permit the transfer circuit 260 to receive the signal on antenna 263 and use some of that signal to create power. Such antennas 263 are well known in the art as used for RFID circuits, NFC circuits, and the like. In the event the set top box 202 is coupled to power, then power to drive the transfer circuit can be received from a power supply inside the set top box, not shown since it is well known in the art. Once the transfer circuit 260 is powered up, whether based on power received from the wireless signal on antenna 263 or the local power from the set top box power supply, it can then receive a signal from the transfer memory 225 via the same signal 212 in order to transfer the data store therein to the transfer memory 225. The transfer is therefore carried out based on the instructions received via the data signal 212 output by the transfer memory 225. The data is therefore safely stored in a separate memory 225 that is in the physical separate housing from the housing 217 of the set top box. This sequence is carried out based on the transfer circuit 260 sending an acknowledgment step 312, receiving a request to output the selected data from the nonvolatile memory 266 in step 314, and outputting the requested system data from the nonvolatile memory 266 to the transfer memory 225 in step 316. If the set top box 202 remains in normal operation and is still coupled to power, as shown in step 318, then the system returns to step 302 and continues repeats the steps of flow chart 300. If the set top box is unpowered and it is not currently in use, then the software operation ends at 320.

Particular beneficial examples in which the inventive system and inventive storage and transfer technique can be used will now be described with respect to FIGS. 4, 5A, and 5B.

Figure 4:
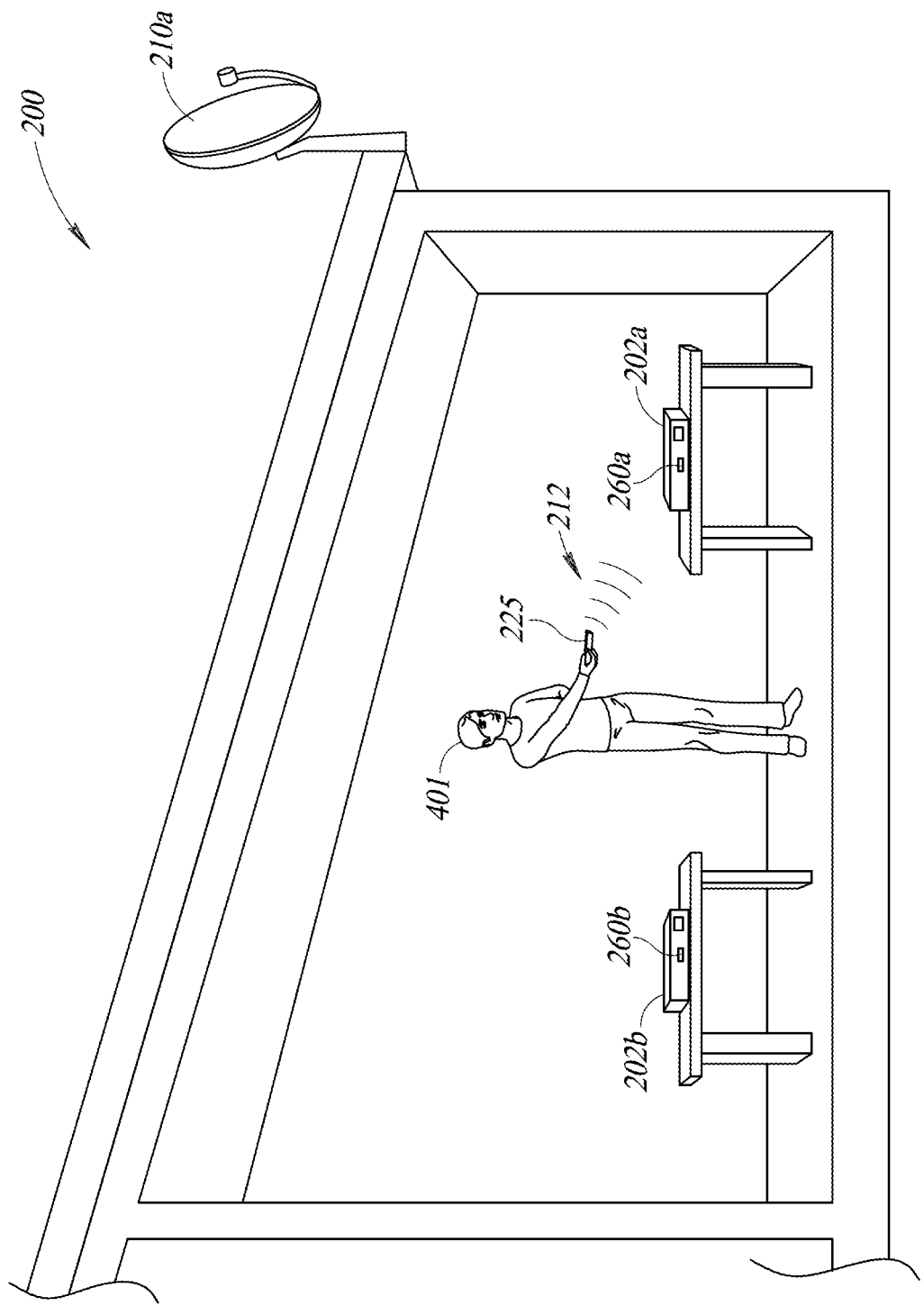
FIG. 4 is a schematic showing use of the inventive system.

FIG. 4 illustrates an embodiment in which a transfer technician 401 desires to transfer the system data from a first set top box 202a to a second set top box 202b. The transfer technician 401 may be the user 201 themselves or it may be a specially trained employee of the manufacturer of the set top box, or other technical person. The set top box 202a may be an old set top box and it is desired by the user 201 to replace that set top box with the new set top box 202b. It is desired to quickly and easily transfer all of the system data, which includes both user specific data of the type previously described, as well as the set top box specific data to the new set box 202b so that it may be automatically and easily positioned for use in the current environment 200 for that particular user 201. Following the steps previously described with respect to FIG. 3, the transfer technician 401 will provide the transfer memory 225 at the proper location in order to send the signal 212 that includes both the power and the data query signal to the transfer circuit 260 inside the set top box 202a. All of the system data will be transferred to the transfer memory 225 and stored therein as instructed by the transfer technician 401. The transfer memory 225 can be in any acceptable memory storage device. For example, the transfer memory 225 may be within a smart phone, a tablet, a small portable computer, smart watch or any acceptable processor that includes a memory and the ability to output a transfer and power signal 212. In a preferred embodiment, the transfer memory is within smart phone, and the NFC or RFID circuits within the smart phone are used in order to activate the transfer memory 225 and output the transfer and power signal 212. The program, in order to control the operation according to the step shown in FIG. 3, can be downloaded as an application from the web, the cloud, the Internet, or any acceptable technique for programming the local transfer device 225.

After the transfer technician 401 obtains the system data from the current set top box 202a they will then transfer that data to the new set top box 202b by inputting the data through the transfer circuit 260 as contained in the new set top box 202b. This transfer takes place using the same steps of FIG. 3 starting at step 306 in which the transfer memory 225 outputs a signal that there is a need to transfer data to the new memory 260b as found in the new set top box 202b. The step of receiving a startup signal from the transfer memory 225 in order to provide power to the transfer circuit 260b are followed as previously described which then sends an acknowledgment as in step 310 and instead of requesting the output of data from the new set top box 202b, it will instruct the transfer circuit 260b to receive new data, and once having received that data it will transfer it to the AV processor which is in the set top box 202b. Accordingly, the data is transferred from the transfer memory 225 to the new set top box 202b and it immediately has stored therein all of the system data including the unique user data, whether a single user or multiple users, as well as the set top box data of the former set top box that was used. It will thus have stored within it its own set top box specific data, as well as the data regarding the entire network in which the prior set top box 202a was connected and the operations settings of that particular set top box 202a. It can, therefore, be configured to operate within the same environment and have the data of that environment, as well as the versions of the software code identifiers that were used in the prior set top box 202a so that it can ensure that it operates in a system that will match the operation of the prior set top box 202a. In the embodiment of FIGS. 2B and 2C, the external memory, whether 227 or 241 is already the transfer memory, the technician 401 can simply remove from the set top box. It already has the system data stored in it and it thus becomes the transfer memory 225 with no additional steps needed to be taken. Thus, once memory 227 is removed from the box attachment or memory 241 is removed from the port, it can act as the transfer memory 225, can then be directly used to transfer the data to the new location, such as the new set top box 202b and the steps of 310-316 of FIG. 3 do not need to be carried out. Rather, these steps have been carried out already and the memory 227 or 241 is ready to use for the transfer at all times.

One benefit of the new system is that when the user desires to have a new set top box this can be shipped directly from the manufacturer of the set top box to the user's home. The user can then unpack the new set top box 202b, plug it into their network, and then using the transfer memory 225 easily transfer all of the system settings from their old set top box 202a to the new set top box 202b within a short period of time, usually less than one hour be fully operational with the new set top box. In this instance, the user 201 is also the transfer technician 401 and is doing the transfer in his home. He can then pack the old set top box 202a in a box 402 and ship it back to the manufacturer This provides significant savings in time as well as avoids the need for a specialized technician to travel to the home of each user in order to install a new set top box.

Figure 5A:
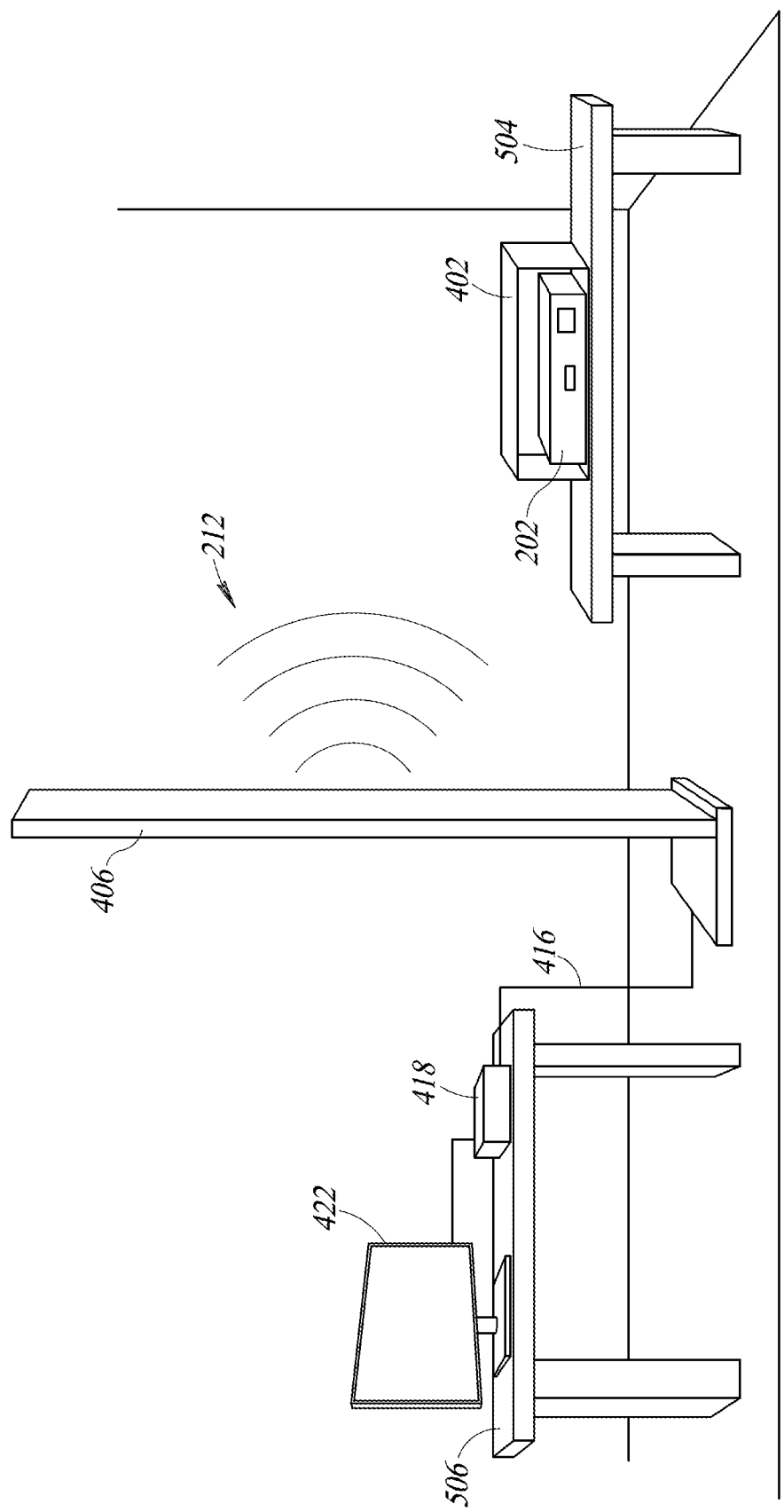
FIG. 5A is one embodiment of an alternative use of the inventive system.

FIG. 5A illustrates another embodiment in which the present inventive system and method can be used. In many instances, the set top box 202 will be sent to a repair facility in order to be diagnosed to determine the error which caused it to fail, need to be repaired, or be reused. The user, or other technician may place the set top box 202 into a shipping box 402 and then ship the box 402 back to the instructed address, such as a repair facility, a warranty center or other location. The set top box 202 arrives in the shipping box 402 at the repair facility and is positioned on an incoming table 504. While the set top box 202 is still within the shipping box 402 it is brought adjacent to a query antenna 406. The query antenna 406 is configured to output a wireless high power signal 212 in order to provide both power and an interrogation to the set top box 202 in a manner similar to that previously described with respect to the transfer memory 225. In particular, the query antenna 406 outputs a signal 212 that is sufficiently powerful to penetrate through the box 402 in which the set top box 202 is located to provide power to the transfer circuit 260 and ask for an output of the data as stored in the nonvolatile memory 266 of the set top box 202. The query antenna 406 provides this data via an electrical transfer to a local processor 418 which is connected by a cable 416, or other acceptable technique. The processor 418 shows a display of the data which has been retrieved from the set top box 202 on a display device 422 sitting on table 506. The information that is displayed can be specific to the set top box 202, such as a model number, serial number, and other information. This can also include user specific data that has been stored in the nonvolatile memory 266. A technician at the repair facility can, therefore, analyze the data which is been received and determine a next step to take with respect to the receipt set top box 202. For example, if the set top box 202 is a very old model and all the circuits therein are completely out of date, a decision may be made to immediately recycle the set top box 202 and all components therein. On the other hand, if the set top box 202 has useful circuits therein, the identity of each circuit therein can be obtained and understood by viewing the data which has been provided on the display 422. The repair technician can then make a decision whether to use some or all of the components in the set top box 202. Alternatively, the repair technician may also be able to diagnose the exact health of the set top box 202, determine what, if any, circuits therein need to be repaired or replaced and then for a relatively low cost restore the set top box 202 to full health and usefulness. The set top box can, therefore, be resold on the market and have additional life.

Figure 5B:
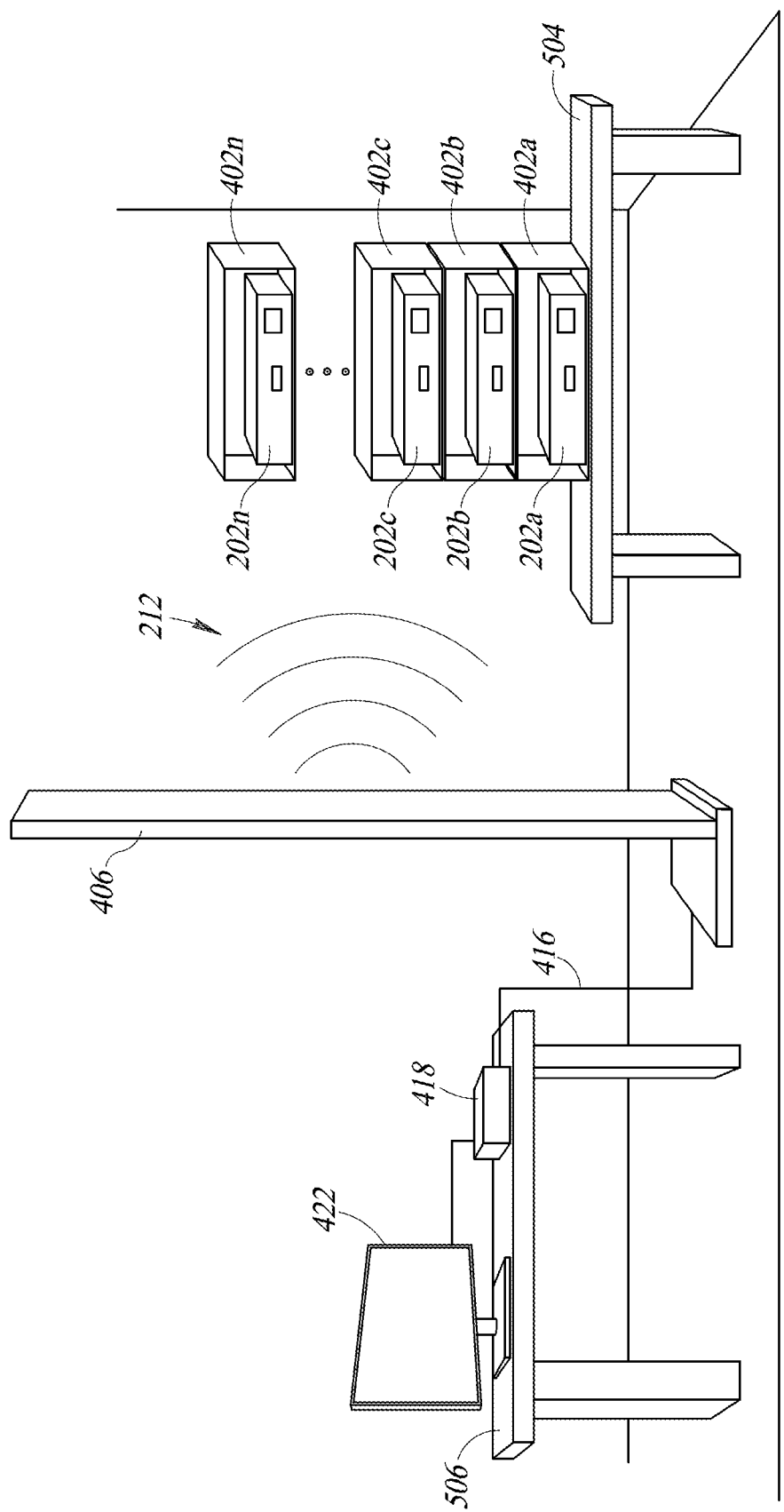
FIG. 5B is an alternative embodiment showing a further use of the inventive system.

FIG. 5B illustrates particular benefit of the wireless query system to the nonvolatile memory 266 using the transfer circuit to 60. This is of particular beneficial when no power is being provided to the set top box 202. In the environment shown in FIG. 5B, as well as the environment FIG. 5A, the set top box is not plugged into any power and no power supply is provided to it. The sole source of power is the wireless signal 212, which can be transmitted through the packing box 402. In the environment FIG. 5B, multiple set top boxes 202a-202n are stored in the respective boxes 402a-402n. The antenna 406 sends out a query via signal 212 to the large stack of set top boxes 202 as each is stored in the respective shipping boxes 402a-402n. Using a time multiplexer sequence or other technique, the query antenna 406 sends a signal to each of the respective set top boxes 202a-202n in order to learn the identity health state and other details regarding the set top boxes 202. Advantageously, this query can be made while all of the set top boxes 202 are in their shipping containers and do not have power provided to them because the full power needed is provided from the query antenna 406 and is received by the respective antennas 263 within each of the set top boxes. If there are dozens, or even hundreds a set top boxes 202, the query can be carried out and out rapid determination made of which of the set top boxes 202 can be easily discarded and which one should be saved for further repair, retrieval of operational circuits, or other additional uses instead of being fully recycled.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system to store back-up data internally within the system itself, the system comprising:
   a repair facility;
   a wireless query antenna located at the repair facility;
   a diagnostic processor coupled to the wireless query antenna;
   a plurality of set top box assemblies positioned at a test location in the repair facility in which each set top box assembly includes:
   a housing;
   a system control computer processor within the housing;
   an audio/video processor within the housing, the audio/video processor being coupled to the system control computer processor and outputting audio/video data to a display to be viewed by a user;
   a first memory within the housing, the first memory being within the system control computer processor and the first memory being configured to receive from the system control computer processor and to store within the first memory system specific data for the system control computer processor, wherein the system specific data include at least user data, user preferences, and previously displayed audio/video data by the audio/video processor within the housing, and operational features of the system control computer processor;
   a second memory positioned within the housing, the second memory being electrically connected to the first memory and the system control computer processor with a direct electrical wire connection, the second memory being configured to store within it the system specific data for the system control computer processor that it receives from the system control computer processor and the first memory, the second memory being a non-volatile memory configured to retain the stored data when no power is being provided to the second memory;

a transfer circuit coupled to the second memory, the transfer circuit being within the housing;

a power and data transfer antenna within the housing, coupled to the transfer circuit, the antenna being configured to receive power from a wireless power supply signal from outside the housing and to send data from the second memory to a location outside the housing via the transfer circuit with the second memory positioned within the housing at a time when no power is being provided to the system control computer processor within the housing;

a power supply line from the power and data transfer antenna configured to provide power from the power and data transfer antenna to the transfer circuit and the second memory when power is provided wirelessly to the power and data transfer antenna; and a data transfer line from the transfer circuit to the power and data transfer antenna, the data transfer line configured to transfer the stored system specific data from the second memory to the power and data transfer antenna for transmission to a location outside of the housing;

wherein the diagnostic processor is configured to cause the wireless query antenna to output a wireless power supply query signal from the query antenna in the repair facility to the plurality of set top box assemblies positioned at the test location in the repair facility, the wireless power supply query signal being sent to all of the plurality of the set top boxes at test location within a same time frame;

wherein the power and data transfer antenna inside the housings of each of set top box at the repair location receives the query signal output by the query antenna and transfer electrical power from the power and data transfer antenna to the non-volatile memory and transfer the system specific settings from the non-volatile memory to the power and data transfer antenna from each respective housings after receiving electrical power from the power and data transfer antenna; and transmitting the stored system specific settings from the non-volatile memory to the wireless query antenna in the repair facility that is outside of the housing via the power transfer antenna for each respective housings positioned at the test location.

2. The system of claim 1 wherein the transfer circuit and the second memory are components of the same circuit and are positioned on the same semiconductor substrate.

3. The system of claim 1 wherein each of the transfer circuit and the second memory are different circuits positioned on different semiconductor substrates.

4. The system according to claim 1 further comprising:
a local backup power within the housing that will provide sufficient power to perform the data transfer from the first memory to the second memory after power is removed from the housing.

5. The system according to claim 4 wherein the local backup power includes at least one of an internal capacitor and an internal battery within the housing that provide sufficient power to perform the data transfer after power is removed from the housing.

6. A method, comprising:
transferring system specific settings from a system control computer processor within a housing to a non-volatile memory that is within the housing, wherein the housing contains within it an audio/video processor coupled to the system control computer processor, the audio/video processor being configured for outputting audio/video data to a display to be viewed by a user;

retaining system specific data stored in the non-volatile memory within the housing when no electrical power is being provided to the housing and to the system control computer processor wherein the system specific settings include at least user specific data, user preferences, and previously displayed audio/video data by the audio/video processor within the housing and operational features of the system control computer processor;

transporting the housing having system control computer processor and the non-volatile memory to a repair facility, the repair facility having a wireless query antenna;

outputting a wireless power supply query signal from the query antenna in the repair facility to the housing of the set top box;

receiving electrical power wirelessly at a power transfer antenna inside the housing from the query signal output by the query antenna, the power transfer antenna being coupled to the non-volatile memory, the power transfer antenna being configured to receive power from a wireless power supply query signal from outside the housing and to send data from outside the housing to circuits inside the housing;

transferring electrical power from the power transfer antenna to the non-volatile memory;

transferring the system specific settings from the non-volatile memory to the power transfer antenna after receiving electrical power from the power transfer antenna; and transmitting the stored system specific settings from the non-volatile memory to the wireless query antenna to a location in the repair facility that is outside of the housing via the power transfer antenna, wherein there are plurality of housings at the repair facility at the same time and the below steps are carried out on each of the plurality of respective housings with the same time frame using a time multiplexer sequence:

outputting a wireless power supply query signal from the query antenna in the repair facility to the housing of each respective set top box;

receiving electrical power wirelessly at a power transfer antenna inside the housing from the query signal output by the query antenna, the power transfer antenna being coupled to the non-volatile memory, the power transfer antenna being configured to receive power from a wireless power supply query signal from outside the housing and to send data from outside the housing to circuits inside the housing;

transferring electrical power from the power transfer antenna to the non-volatile memory;

transferring the system specific settings from the non-volatile memory to the power transfer antenna from each respective housing after receiving electrical power from the power transfer antenna; and transmitting the stored system specific settings from the non-volatile memory to the wireless query antenna to a location in the repair facility that is outside of the housing via the power transfer antenna for each respective housing.

7. The method of claim 6 wherein transmitting the stored system specific settings from the non-volatile memory to a location outside of the housing via the power transfer antenna includes:
    transmitting the system specific settings from inside a storage container having the housing contained therein to a location outside of the storage container.

8. The method of claim 6 wherein the step of transferring electrical power from the power transfer antenna to the non-volatile memory includes:
    transferring electrical power from the power transfer antenna to the non-volatile memory via a transfer circuit.

9. The method of claim 6 wherein the step of transferring the system specific settings from the non-volatile memory to the power transfer antenna after receiving electrical power from the power transfer antenna includes:
    transferring the data from the non-volatile memory to the power transfer antenna via a transfer circuit.

10. The method of claim 6 further comprising:
    receiving an indication that power is being removed from the system control computer processor;
    transferring the system specific settings from the system control computer processor as part of the turnoff routine of the system control computer processor prior to full shut down of the system control processor.

11. The method of claim 10 wherein the indication that power is being removed from the system control computer processor is a turn off signal input by user.

12. The method of claim 10 wherein the indication that power is being removed from the system control computer processor is when the housing is suddenly deprived of power.

13. The method of claim 6 wherein the repair facility is a mobile van.

14. The method of claim 6 wherein the repair facility is a retail outlet.

* * * * *